(12) United States Patent
Wilson et al.

(10) Patent No.: US 6,844,537 B2
(45) Date of Patent: Jan. 18, 2005

(54) METHOD AND DEVICE FOR MEASURING THE VELOCITY OF A MOVING SURFACE

(75) Inventors: Mark L. Wilson, Vadnais Heights, MN (US); Bernard S. Fritz, Eagan, MN (US)

(73) Assignee: Honeywell International Inc., Morristown, NJ (US)

( * ) Notice: Subject to any disclaimer, the term of this patent is extended or adjusted under 35 U.S.C. 154(b) by 414 days.

(21) Appl. No.: 10/037,012

(22) Filed: Dec. 31, 2001

(65) Prior Publication Data

US 2003/0122054 A1 Jul. 3, 2003

(51) Int. Cl.[7] .............................. G01C 21/02; G01P 3/36
(52) U.S. Cl. ........................ 250/206.1; 356/28; 73/597
(58) Field of Search ............................... 250/221, 206, 250/206.1, 206.2; 356/27, 28, 28.5; 73/597, 601

(56) References Cited

U.S. PATENT DOCUMENTS

| | | |
|---|---|---|
| 3,915,572 A | 10/1975 | Orloff |
| 3,970,781 A | 7/1976 | Dalton et al. |
| 4,036,557 A | 7/1977 | Christensen |
| 4,181,432 A | 1/1980 | Flower |
| 4,263,002 A | 4/1981 | Sathyakumar |
| 4,284,351 A | 8/1981 | Alidritt et al. |
| 4,340,299 A | 7/1982 | Mongeon |
| 4,467,168 A | 8/1984 | Morgan et al. |
| 4,470,696 A | 9/1984 | Ballard |

(List continued on next page.)

FOREIGN PATENT DOCUMENTS

EP 1308732 A1 * 5/2003 ............. G01P/5/00

OTHER PUBLICATIONS

Bachalo, W. "Laser Doppler Velocimetry Primer for the Fluid Dynamics Research Branch", National Aeronautics and Space Administration, NASA Contractor Report 177386, pp. 1–94 (Dec. 1985).

(List continued on next page.)

*Primary Examiner*—Stephone B. Allen
(74) *Attorney, Agent, or Firm*—Andrew A. Abeyta

(57) ABSTRACT

The invention includes a device for measuring the velocity of a target that includes an array of vertical cavity surface emitting lasers having an energy output, a first lens configured to capture the energy output of the array and project it onto the target whose velocity is to be monitored, a second lens configured to capture the energy output reflected from the target, and at least one detector configured to detect the energy transmitted from the second lens, where the energy of the array projected onto the target creates pulses of light from reflectance off of surface imperfections on the target, and the velocity of the target is determined by monitoring the frequency of the pulses of light. The invention also includes a method of measuring the velocity of a target that includes projecting an image of at least one vertical cavity surface emitting laser array onto the target, monitoring the intensity pattern formed from the image reflecting off of the target with at least one light intensity detector to produce an analog signal, converting the analog signal to a digital signal having the same frequency, measuring the frequency of the digital signal with a counter, and processing the frequency with a microprocessor to determine the velocity of the target.

26 Claims, 2 Drawing Sheets

U.S. PATENT DOCUMENTS

| | | |
|---|---|---|
| 4,596,254 A | 6/1986 | Adrian et al. |
| 4,609,266 A | 9/1986 | Blom |
| 4,630,905 A | 12/1986 | Blom |
| 4,632,524 A | 12/1986 | Blom |
| 4,636,046 A | 1/1987 | Blom |
| 4,641,933 A | 2/1987 | Blom |
| 4,663,514 A | 5/1987 | Blom |
| 4,669,876 A | 6/1987 | Dopheide |
| 4,674,850 A | 6/1987 | Blom |
| 4,715,707 A | 12/1987 | Reynolds, III et al. |
| 4,843,564 A | 6/1989 | Jenson |
| 4,919,532 A | 4/1990 | Mocker et al. |
| 5,104,745 A | 4/1992 | Cave et al. |
| 5,187,538 A | 2/1993 | Iwamoto et al. |
| 5,309,223 A | 5/1994 | Konicek et al. |
| 5,325,175 A | 6/1994 | Mocker et al. |
| 5,329,359 A | 7/1994 | Tachikawa |
| 5,387,969 A | 2/1995 | Marantette |
| 5,396,510 A | 3/1995 | Wilson |
| 5,404,373 A | 4/1995 | Cheng |
| 5,475,701 A | 12/1995 | Hibbs-Brenner |
| 5,526,109 A | 6/1996 | Johnson |
| 5,550,856 A | 8/1996 | Cheng |
| 5,583,342 A | 12/1996 | Ichie |
| 5,587,785 A | 12/1996 | Kato et al. |
| 5,619,318 A | 4/1997 | Yamamoto et al. |
| 5,623,307 A | 4/1997 | Kotidis et al. |
| 5,626,526 A | 5/1997 | Pao et al. |
| 5,666,376 A | 9/1997 | Cheng |
| 5,796,112 A | 8/1998 | Ichie |
| 5,799,030 A | 8/1998 | Brenner |
| 5,812,250 A | 9/1998 | Ishida et al. |
| 5,831,720 A | 11/1998 | Ishida et al. |
| 5,893,722 A | 4/1999 | Hibbs-Brenner et al. |
| 5,990,990 A | 11/1999 | Crabtree |
| 6,008,887 A | 12/1999 | Klein et al. |
| 6,037,644 A | 3/2000 | Daghighian et al. |
| 6,067,391 A | 5/2000 | Land |
| 6,078,384 A | 6/2000 | Dammann et al. |
| 6,084,697 A | 7/2000 | Lebby et al. |
| 6,130,873 A | 10/2000 | Lazarev et al. |
| 2002/0148952 A1 * | 10/2002 | Tatum et al. ............... 250/221 |

OTHER PUBLICATIONS

"Impact and Ballistics of Composite Structures", Composites Group, http://www.composites.ubc.ca/units/comp/research/impact.asp, 5 pages (Last updated Nov. 23, 1998).

* cited by examiner

METHOD AND DEVICE FOR MEASURING THE VELOCITY OF A MOVING SURFACE

FIELD OF THE INVENTION

The invention generally pertains to a method of monitoring surface translation and motion. More particularly, the invention pertains to a method of monitoring surface translation and motion that utilizes an array of vertical cavity surface emitting lasers and at least one detector to monitor the frequency of an intensity pattern, and determine the velocity of an object thereby.

BACKGROUND OF THE INVENTION

Laser Doppler Velocimetry (LDV) techniques have been utilized for many years to monitor the motion of moving objects. The coherence of the laser is utilized to project a "fringe pattern" on to the moving object. Small imperfections on the object such as scratches traverse the projected fringe pattern giving rise to an AC modulation in the reflected optical energy.

FIG. 1 shows the basic components of a single component LDV system commonly used in the art. The laser beam is split into two equal intensity beams and focused to an overlap region, which partially defines the sample volume. In order to obtain velocity measurements of an object, the object must possess some surface irregularity, which is analogous to particles in a flow for measuring the velocity of the flow. The surface irregularities on the object that pass through the sample volume scatter light, a part of which enters the receiver lens aperture. This light is focused onto the small aperture on the photodetector. If the receiver is located off-axis, the intersection of the image of the aperture and the focused laser beam form a very small sample volume. This technique can be used to effectively limit the detected light from only those particles that cross the overlap region of the beams.

Within the beam intersection region, light from the two incident beams interferes to create a fringe pattern. These fringes form parallel planes, which lie perpendicular to the plane of the incident beams yet parallel to the beam bisector. The spacing, delta, between successive fringe planes is given by $$\delta = \frac{\lambda}{2\sin\left(\frac{\theta}{2}\right)}$$

where $\lambda$ is the light wavelength and $\theta$ is the beam intersection angle. Irregularities transit the probe volume; they scatter light in proportion to the light incident upon them, which varies with the intensity of the fringe pattern. It is very important to have a large degree of beam overlap to insure that the highest fringe visibility occurs.

Photomultiplier tubes are used to convert the detected light to an electronic signal. A familiar Doppler "burst" signal is shown in FIG. 2. The Doppler "burst" signals consist of a pedestal component which is a result of the Gaussian intensity distribution of the laser beam and a Doppler component. The Doppler or high frequency components arises from the irregularities passing the interference fringes. In addition to these frequency components there is the inevitable noise produced by such phenomena as distortions to the laser beams, glare light from optical components, and electronic noise.

Because of the inevitable noise present in the signal, signal processing must be utilized. With the most commonly used signal processors, the pedestal or low frequency component of the signal must be removed by a high pass filter. The high pass filter cutoff must be low enough to avoid excessive attenuation of the Doppler frequency information. However, if the filter is set too low the pedestal will not be fully removed producing a filter distortion. If the filter distortion is large enough, for example, due to a large signal, the frequency at the trailing part of the signal can be interpreted incorrectly by as much as an order of magnitude.

Several methods are available for processing LDV signals one of which is counter processors. Signal processing systems that produce information in the frequency domain are dependent on the transit time of the Doppler burst and are in general sensitive to the amplitude of the signal. Counter processors obtain measurements in the time domain, which are free from transit time broadening errors.

The basic principles of counting methods are relatively straightforward. High pass filtering is first required to remove the pedestal. If this is done properly, the zero crossings will be independent of the signal amplitude and represent the period of the Doppler difference frequency. Typically, the electronic system will average the period over a number of cycles in the burst, preferably all of the cycles that are above the threshold. However, measurements in the time-domain are independent of the burst duration so the number of cycles in the burst does not influence the measurements. With noise on the signals, averaging over the greatest number of cycles available can ameliorate the effects of any erroneous counts.

A signal is detected when the signal voltage exceeds a threshold level, which is set just above the baseline noise level. When the threshold is exceeded, three counters are started on the next zero crossing. Two counters measure the Doppler period and one counts the number of cycles.

A high-speed crystal stabilized clock (100 MHz to 1 GHz) is enabled and turned off at the end of N counts. The gate can open at any time so the count error can be as much as +/−1 clock count. Because high-speed counters are now used, this error is generally insignificant. As an example, if the Doppler difference frequency is 20 MHz and the clock frequency is 500 MHz, for eight cycles the clock counts will be $$N_{clock} = \frac{(500 \times 10^6 / \text{sec})(8 \text{ cycles})}{20 \times 10^6 / \text{sec/cycle}}$$

$$N_{clock} = 200$$

The maximum count error is 1/200, which is much less than the errors that may result due to noise. It should be apparent that the signal quality is the first concern in achieving accurate measurements. After the signal is high-pass filtered, the time between zero crossings on the positive slope of the signal is measured to determine the frequency. The velocity is then the product of the frequency and fringe spacing.

The velocity of the object is then determined by monitoring the frequency, which can be related to the surface velocity using geometric factors. This type of sensor is valuable since there is no physical contact with the moving surface, and the measurement is independent from the surface finish or color (assuming it is not a perfectly smooth surface without Surface scratches or small features). However, systems for making LDV measurements are often quite expensive because they require high precision optical components.

Therefore, there is a need for an inexpensive LDV system that still offers accurate and precise measurements of the velocity of moving objects.

SUMMARY OF THE INVENTION

The following summary of the invention is provided to facilitate an understanding of some of the innovative features unique to the present invention, and is not intended to be a full description. A full appreciation of the various aspects of the invention can be gained by taking the entire specification, claims, drawings, and abstract as a whole.

In accordance with one aspect of the invention, there is provided a device for measuring the velocity of a moving surface that includes an array of vertical cavity surface emitting lasers, a first lens or other optic device configured to capture the energy output of the array and project it onto the surface whose velocity is to be monitored, a second lens or other optic device configured to capture the energy output reflected or scattered from the surface whose velocity is to be monitored, and at least one detector configured to detect the energy transmitted from the second lens, where the energy of the array projected onto the moving surface whose velocity is to be monitored creates pulses of light from reflectance off of surface imperfections on the moving surface, and the velocity of the moving surface is determined by monitoring the frequency of the pulses of light.

Preferably, the array of vertical cavity surface emitting lasers is a one- or two-dimensional array, and more preferably is a one-dimensional array. Preferably the array has at least 10 lasers, and more preferably has at least 16 lasers. Preferably, the lasers are spaced from about 10 to 500 $\mu$m apart, more preferably from about 25 to 150 $\mu$m apart, and most preferably from about 50 to 100 $\mu$m apart.

Preferably the lasers of the array emit light with a wavelength of from about $10^{-7}$ to $10^{-8}$ m. More preferably, the lasers emit light with a wavelength of from about $4\times10^{-7}$ to $8\times10^{-7}$ m. Most preferably, the lasers emit light with a wavelength of from about $6\times10^{-7}$ to $7\times10^{-7}$ m.

In accordance with another aspect of the invention, there is provided a method of measuring the velocity of a moving surface that includes projecting an image of an array of vertical cavity surface emitting lasers onto the moving surface, monitoring the intensity pattern formed from the image reflecting off of the moving surface with a light intensity detector to produce an analog signal, converting the analog signal to a digital signal having the same frequency, measuring the frequency of the digital signal with a counter, and processing the frequency with a microprocessor to determine the velocity of the moving surface.

In another embodiment, the method further comprises measuring the frequency of the digital signal with another counter to verify the data by comparing the frequencies. Preferably, the verification of the data is accomplished by having the second counter count for a period of time that is twice as long as the first and not considering data that does not have twice the number of counts.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the scope of the invention will become apparent to those of skill in the art from the detailed description of the invention and claims that follow.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

It should be understood that the drawings are not necessarily to scale and that the embodiments are illustrated using graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PREFERRED EMBODIMENT

A VCSEL based optical sensor used to measure the velocity or translation of a surface is detailed below. The sensor is based on the principle of using a modulated spatial intensity distribution on the surface of interest and measuring the signal generated by scatter off of the surface as the translating surface moves across the modulation intensity distribution. The scattered energy is captured by a lens, which redirects it onto a detector.

Device

Figure 1:
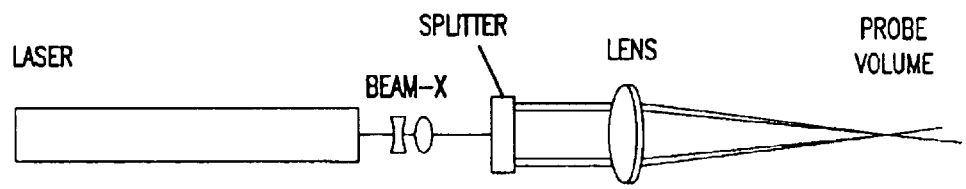
FIG. 1 depicts a schematic illustration of a single component LDV system of the prior art.
Figure 2:
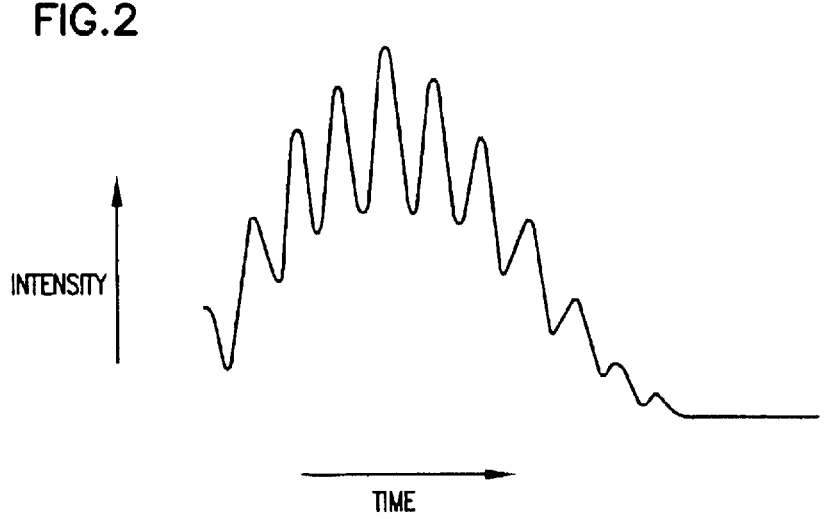
FIG. 2 depicts a common Doppler burst signal.
Figure 3:
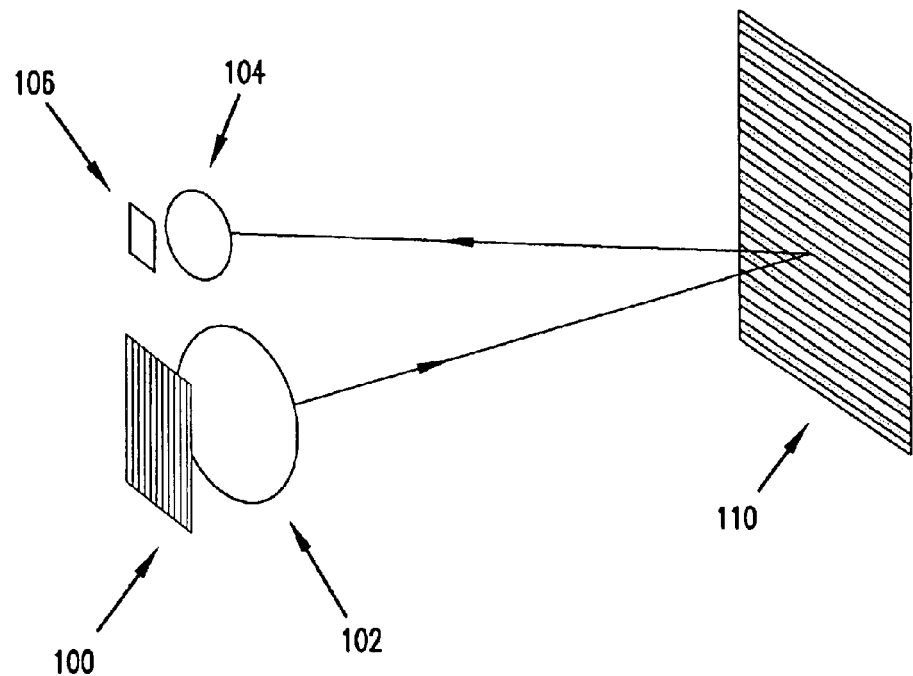
FIG. 3 depicts a schematic illustration of one embodiment of a device in accordance with the invention.

A device in accordance with one aspect of the invention is depicted in FIG. 3. The device comprises a VCSEL array 100, a first lens 102, a second lens 104, and a detector 106. It should be understood that the present invention can include additional lens and optical systems and additional detectors. The embodiments described herein are for ease of understanding and are not limited by the number of elements described. A VCSEL array 100 for use in the invention can be manufactured by any generally accepted method. Exemplary methods of manufacturing VCSEL arrays can be found in U.S. Pat. No. 5,475,701 ("Hibbs-Brenner") and U.S. Pat. No. 5,893,722 ("Hibbs-Brenner et al."), which are incorporated herein by reference.

The VCSEL array 100 can comprise VCSELs having the same or different wavelengths of emission. Preferably, VCSEL array 100 contains VCSELs of the same wavelength. The VCSEL array 100 comprises at least two (2) individual VCSELs. Preferably, the VCSEL array 100 comprises from about sixteen (16) to sixty-four (64) individual VCSELs. More preferably, VCSEL array 100 comprises from about 16 to 32 individual VCSELs. The individual VCSELs that make up VCSEL array 100 can be spaced from about 10 to 500 $\mu$m apart. Preferably, the individual VCSELs that make up VCSEL array 100 are spaced from about 25 to 150 $\mu$m apart. More preferably, the individual VCSELs that make up VCSEL array 100 are spaced from about 50 to 100 $\mu$m apart.

The individual VCSELs that make up VCSEL array 100 can be made of any material generally utilized to make VCSELs. The specific material chosen depends on the ultimate desired wavelength of the VCSEL. Preferably, the individual VCSELs are made of a material that causes the VCSEL to emit light with a wavelength from about $10^{-7}$ to $10^{-6}$ m. More preferably, the individual VCSELs are made of a material that causes the VCSEL to emit light with a wavelength of from about $4\times10^{-7}$ to $8\times10^{-7}$ m. Most preferably, the individual VCSELs are made of a material that causes the VCSELs to emit light with a wavelength of about 600 to 700 nm ($6\times10^{-7}$ to $7\times10^{-7}$ m), red visible light.

VCSEL array 100 can be a one- or two-dimensional array. Whether VCSEL array 100 is a one- or two-dimensional array depends on the velocity measurements to be performed. For example, if velocity were to be measured in one dimension only, a one-dimensional array would suffice. However, if velocity were to be measured in two dimensions, for example, for measurement of the velocity of a computer mouse relative to a surface, a two-dimensional array would be used. Preferably, VCSEL array 100 is a one-dimensional array.

A device useful in the invention also comprises a first lens 102. First lens 102 is positioned so that the energy output of VCSEL array 100 is focused by the lens onto the monitoring area or target 110. First lens 102 is chosen so that it gathers substantially all the energy output from VCSEL array 100 and projects it in a focused manner onto monitoring area or target 110. First lens 102 can comprise any type of lens. Preferably first lens 102 is a conventional lens. First lens 102 can be made of any material generally used to manufacture conventional lenses, such as, glass or plastic. Further, it should be understood that the target can be between array 100 and first lens 102 and second lens 104 and detector 106 when the present invention is configured in a transmissive mode rather than a reflective mode. In other words, the embodiment shown in FIG. 3 can be arranged such that energy from array 100 is transmitted through the target 110 and then detected on the other side of target 110 by detector 106.

The focal length of first lens 102 is chosen within the context of the remainder of the device and the physical parameters of the measuring area. The focal length of first lens 102 is chosen based in part on the size of VCSEL array 100. In turn, the size of VCSEL array 100 depends on the number of individual VCSELs and the spacing of the individual VCSELs. The focal length of first lens 102 also dictates the distance of the monitored area 110. The focal length of first lens 102 should be large enough to capture substantially all of the energy output from VCSEL array 100 and focus it onto monitoring area 110.

The relationship of the focal length of first lens 102, the distance of first lens 102 from VCSEL array 100 and monitored area 110 is dictated by the following equation.

$$\frac{1}{\text{distance of VCSEL array 100 from first lens 102}} + \frac{1}{\text{distance of monitored area 110 from first lens 102}} = \frac{1}{\text{focal length of first lens 102}}$$

One of skill in the art would realize that the units for the distances and focal lengths must be the same, whether inches, cm, mm, etc. Preferably, the focal length of first lens 102 is from about 0.5 to 5 cm. More preferably, the focal length of first lens 102 is from about 0.5 to 2 cm. Most preferably, the focal length of first lens 102 is from about 1 to 2 cm. Preferably, the distance of monitored area 110 from first lens 102 is from about 1 to 15 cm. More preferably, the distance of monitored area 110 from first lens 102 is from about 1 to 10 cm. Most preferably, the distance of monitored area 110 from first lens 102 is from about 2 to 6 cm.

A device useful in the invention also comprises a second lens 104. Second lens 104 may or may not be substantially similar to first lens 102. The focal length, and physical distance of second lens 104 is under the same constraints as first lens 102 was, which can be represented by the equation below.

$$\frac{1}{\text{distance of monitored area 110 from second lens 104}} + \frac{1}{\text{distance of second lens 104 from detector 108}} = \frac{1}{\text{focal length of second lens 104}}$$

In addition to being manufactured as separate elements, first lens 102, and second lens 104 can be manufactured to be one element. For example, first lens 102 and second lens 104 can be part of a single piece of material with a barrier separating them. Preferably, first lens 102 and second lens 104 are constructed from one piece of lens material, such as plastic, and are separated by a barrier, preferably of a material that is non-transmissive to the wavelength of energy being utilized.

A device useful in the invention also includes at least one detector 106 although more can be used. Detector 106 can be any generally utilized detector that is capable of monitoring the energy output from VCSEL array 100. Preferably, detector 106 is a p-n photodiode. The detector 106, if a p-n photodiode, can be made of any material generally utilized for p-n photodiodes. The specific material utilized depends on the wavelength at which the VCSEL array 100 emits light. If the VCSEL array is emitting light in the visible range, a preferred material for the detector 106 is silicon.

Figure 4:
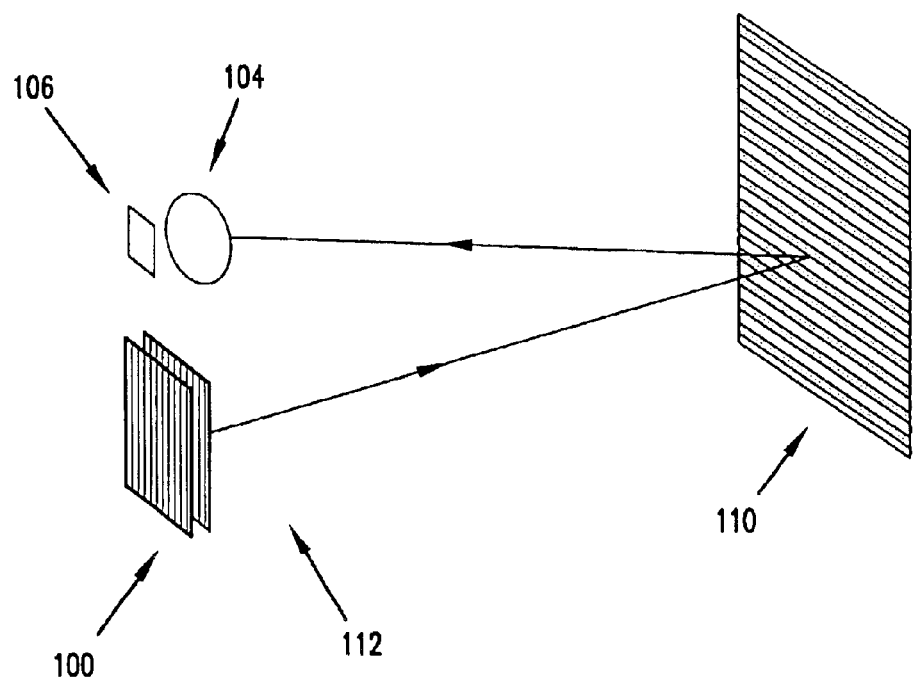
FIG. 4 depicts a schematic illustration of another embodiment of a device in accordance with the invention.

FIG. 4 depicts another embodiment in accordance with a device of the invention. This embodiment of the device is similar to that depicted in FIG. 3 except that first lens 102 is replaced by microlens array 112. Microlens array 112 serves a similar function as first lens 102 except that it is more versatile in its functioning. Microlens array 112 can be used to modify the output of VCSEL array 100 in ways that first lens 102 could not. For example, if VCSEL array 100 had individual VCSELs that were spaced at farther distances, microlens array 112 could be used to bring the output of that VCSEL array 100 closer together. Further, it should be understood that the target can be between array 100 and microlens array 112 and lens 104 and detector 106 when the present invention is configured in a transmissive mode rather than a reflective mode. In other words, the embodiment shown in FIG. 4 can be arranged such that energy from array 100 and microlens array 112 is transmitted through the target 10 and then detected on the other side of target 110 by detector 106.

Any of the embodiments in accordance with the invention can be utilized to measure the velocity of a number of different types of monitored areas 110. The only constraint of monitored area 110 is that it have some microscopic imperfections on its surface. Examples of materials whose velocity may not be able to be monitored by a device in accordance with this invention are smooth glass materials, and smooth metal materials although it may be possible.

Method of Measurement

A device in accordance with one aspect of the invention can be used to monitor the velocity of monitored area 110. A description of how the velocity of an object based on monitored area 110 can be determined using a device of the invention follows.

A device in accordance with the invention projects an image of the output of VCSEL array 100 onto monitored area 110. As monitored area 110 moves out of the projected image of the VCSEL array 100, the microscopic imperfections on the surface of monitored area 110 create an "intensity pattern". This intensity pattern is simply a series of energy pulses that are seen as light and dark pulses. The energy pulses are monitored by the detector 106. The speed at which monitored area 110 is moving through the projected image of VCSEL array 100 determines the frequency of the pulses monitored by the detector 106 during a discrete amount of time. This process can be better understood by considering an example with illustrative data.

Assuming, for purposes of this example, that VCSEL array 100 is made up of 10 individual VCSELs, separated by 100 μm. If the image of VCSEL array 100 is projected onto monitored area 110 a 1000 μm (1 mm) distance, having 10 individual VCSEL spot images can be monitored by detector 106 (10 spots/1 mm). If the surface of monitored area 110, whose velocity is to be measured, is moving at 1 m/sec (1000 nm/sec) that will result in 10 spots/1 msec, or a frequency of 10,000 Hz (10 KHz). Therefore, a VCSEL array 100 configured with its individual VCSELs 100 μm apart, and a detector set to monitor 10 of the VCSELs (the array could have 10 or more VCSELs), will have a resulting frequency of 10 KHz if the monitored area 110 is moving at 1 m/sec. Similarly, if monitored area 110 is moving at 10 m/sec, a frequency of 100 KHz will be measured.

The following discussion illustrates one method by which the above utilized data can be collected using a device in accordance with the invention. First, the analog signal obtained from the detector 106 can be converted to a digital signal, having the same frequency, by using a zero crossing Schmidt trigger with hysteresis. A high speed counter can then be used to measure the monitored frequency. Since the spacing between the individual VCSELs of the VCSEL array 100 (that results in the image projected onto monitored area 110) is known, the velocity can be easily derived from this frequency measurement.

The high speed counter measures the length of time it takes to count a fixed number of cycles of the Doppler frequency (for example, 16 cycles). The counter contains a zero crossing Schmidt trigger with hysteresis to provide an accurate frequency which is unaffected by the magnitude of the signal. The time accuracy of the counter is determined by the speed of the clock used, which is generally in the range of 30 to 35 MHz for CMOS electronics.

The counter is generally constructed to be able to measure any frequency between 500 Hz and 5 MHz (a 10,000:1 range). Two separate counters are used for data verification in order to eliminate bad data points. The first counter is used to measure the time it takes to count the number of clock pulses occurring while a scratch or defect on the moving surface traverses 8 imaged VCSEL spots (cycles). The second counter measures the time it takes to count the number of clock pulses occurring while a scratch or defect on the moving surface traverses 16 imaged VCSEL spots (cycles). If the time for 8 cycles is not half of that for 16 cycles, the data is considered invalid. If the data passes this test, it is used to determine the frequency. The frequency is determined with the following relationship $$f_d = \frac{N_c}{N * \tau}$$

where
$N_c$=number of cycles counted (in this case 16)
N=number of clock cycles counted by counter and
$\tau$=clock cycle time (1/50 MHz=20 ns).

By combining the previous two equations, it can be shown that the velocity is inversely proportional to the number of clock cycles counted, N. The constant of proportionality is a function of the wavelength, crossing angle, number of signal cycles counted and the clock cycle time. However, all of these parameters are fixed and do not vary. Thus, a simple microprocessor can output the velocity information easily from the digital counter data. The microprocessor can also be used to correct the data for thermal effects, and to provide a smart interface to other computers or controller systems.

A co-pending and commonly assigned U.S. patent application Ser. No. 09/615,023, which is incorporated herein by reference, describes a laser Doppler velocimetry signal processor. The signal processor described therein was designed to meet the needs of flow measurement in lightly and heavily seeded flows, and of certain signals obtained from moving solid surfaces such as a paper machine. In solid surface applications there is a large number of scattering particles randomly distributed on the surface. In general, the phase noise associated with a random distribution of scattering centers entering and leaving the measurement volume gives rise to a noise signal, which has all frequencies less than the frequency equally probable.

The signal processor algorithm covered in U.S. patent application Ser. No. 09/615,023 uses the fact that during any given interval, some non-phase noise corrupted Doppler signals occur. This will be the highest frequency obtained by sampling in a given period of time (0.1 second). This frequency will then be remembered and used by a microprocessor to compare with subsequent readings for a programmable interval. If the instantaneous reading is quite different to the stored reading, it is eliminated as a good signal. This stored highest frequency is held for a specific time interval and then is released and another highest frequency is obtained. Several readings are then averaged to provide the output signal.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

The embodiments of an invention in which an exclusive property or right is claimed are defined as follows:

1. A device for measuring the velocity of a target comprising:
   an array of vertical cavity surface emitting lasers having an energy output;
   a first lens configured to capture the energy output of said array of vertical cavity surface emitting lasers and project it onto said target whose velocity is to be monitored;
   a second lens configured to capture the energy output reflected from said target; and
   at least one detector configured to detect energy transmitted from said second lens;
   wherein said energy of said array of vertical cavity surface emitting lasers projected onto said target creates pulses of light from reflectance off of surface imperfections on said target, and the velocity of said target is determined by monitoring the frequency of said pulses of light.

2. The device of claim 1, wherein said array of vertical cavity surface emitting lasers comprises at least 10 vertical cavity surface emitting lasers.

3. The device of claim 2, wherein said array of vertical cavity surface emitting lasers comprises at least 16 vertical cavity surface emitting lasers.

4. The device of claim 1, wherein said array of vertical cavity surface emitting lasers emits light with a wavelength of from about $10^{-7}$ to $10^{-8}$ m.

5. The device of claim 4, wherein said array of vertical cavity surface emitting lasers emits light with a wavelength of from about $4 \times 10^{-7}$ to $8 \times 10^{-7}$ m.

6. The device of claim 5, wherein said array of vertical cavity surface emitting lasers emits light with a wavelength of from about $6 \times 10^{-7}$ to $7 \times 10^{-7}$ m.

7. The device of claim 1, wherein said array of vertical cavity surface emitting lasers is at least a one-dimensional array.

8. The device of claim 7, wherein said array of vertical cavity surface emitting lasers is a one-dimensional array.

9. The device of claim 7, wherein said array of vertical cavity surface emitting lasers is a two-dimensional array.

10. The device of claim 1, wherein said vertical cavity surface emitting lasers comprising said array are placed from about 10 to 500 $\mu$m apart.

11. The device of claim 10, wherein said lasers are placed from about 25 to 150 $\mu$m apart.

12. The device of claim 11, wherein said vertical cavity surface emitting lasers are placed from about 50 to 100 $\mu$m apart.

13. The device of claim 1, wherein the array of vertical cavity surface emitting lasers produces an array of source light spots, and the first lens is adapted to project the array of source light spots onto the target such that a corresponding array of target light spots are present on the target.

14. The device of claim 13, wherein the source light spots are spaced from one another.

15. The device of claim 14, wherein the target light spots are spaced from one another.

16. A method of measuring the velocity of a target comprising:

projecting an image of a vertical cavity surface emitting laser array onto said target;

monitoring the intensity pattern formed from said image reflecting off of the target with at least one light intensity detector to produce an analog signal;

converting said analog signal to a digital signal with the same frequency;

measuring said frequency of said digital signal with a first counter, and processing said frequency with a microprocessor to determine the velocity of said target.

17. The method of claim 16, further comprising obtaining two or more velocity measurements of said target and determining the average of selected ones of said two or more velocity measurements.

18. The method of claim 16, further comprising measuring said frequency of said digital signal with a second counter in order to verify the data by comparing said measured frequencies.

19. The method of claim 18, wherein said verification is accomplished by having said second counter count for twice as long as said first counter, and said frequency measurement is not considered valid if there is not twice the number of counts obtained from said second counter.

20. The method of claim 16 wherein the projecting step projects an array of light spots onto the target.

21. The device of claim 20, wherein the light spots are spaced from one another.

22. A device for measuring the velocity of a target comprising:

an array of vertical cavity surface emitting lasers having an energy output;

at least one first optic device configured to capture the energy output of said array and project it onto said target whose velocity is to be monitored;

at least one second optic device configured to capture the energy output from said target; and at least one detector configured to detect energy transmitted from said second optic device;

wherein said energy of said array of vertical cavity surface emitting lasers that is projected onto said target creates pulses of light corresponding to surface imperfections on said target, and the velocity of said target is determined by monitoring said pulses of light.

23. The device of claim 22, wherein the array of vertical cavity surface emitting lasers produces an array of source light spots, and the first optic device is adapted to project the array of source light spots onto the target such that a corresponding array of target light spots are present on the target.

24. The device of claim 23, wherein the source light spots are spaced from one another.

25. The device of claim 24, wherein the target light spots are spaced from one another.

26. A device for measuring the velocity of a monitored area comprising:

an array of vertical cavity surface emitting lasers, having an energy output;

at least one detector; and an optical path between the array and the at least one detector, wherein the optical path provides a path for the energy output of said array of vertical cavity surface emitting lasers; and wherein the at least one detector is configured to detect energy from said array of vertical cavity surface emitting lasers; and wherein said energy received by said at least one detector corresponds to surface imperfections on said monitored area whose velocity is to be monitored.

* * * * *